(12) United States Patent
Battersby et al.

(10) Patent No.: US 6,894,736 B2
(45) Date of Patent: May 17, 2005

(54) LIQUID CRYSTAL DISPLAY HAVING A POLYMER OR SPIN-ON GLASS AS A CAPACITOR DIELECTRIC AND A METHOD OF MANUFACTURE

(75) Inventors: Stephen J. Battersby, Haywards Heath (GB); Steven C. Deane, Redhill (GB)

(73) Assignee: Koninklijke Philips Electronics N.V., Eindhoven (NL)

( * ) Notice: Subject to any disclaimer, the term of this patent is extended or adjusted under 35 U.S.C. 154(b) by 619 days.

(21) Appl. No.: 09/728,189

(22) Filed: Dec. 1, 2000

(65) Prior Publication Data

US 2001/0008434 A1 Jul. 19, 2001

(30) Foreign Application Priority Data

Dec. 1, 1999 (GB) ................................ 9928353

(51) Int. Cl.⁷ ............................................. G02F 1/136
(52) U.S. Cl. .............................. 349/42; 349/38; 257/59
(58) Field of Search ............................. 349/38, 39, 42, 349/138; 257/59, 72

(56) References Cited

U.S. PATENT DOCUMENTS 6,057,896 A * 5/2000 Rho et al. ..................... 349/42

FOREIGN PATENT DOCUMENTS

EP        0 668 528 A1 *  8/1995  ........... G02F/1/136

* cited by examiner

Primary Examiner—Robert H. Kim
Assistant Examiner—P. R. Akkapeddi
(74) Attorney, Agent, or Firm—Aaron Waxler

(57) ABSTRACT

A transistor substrate for a liquid crystal display comprises an array of insulated-gate staggered TFTs and a capacitor (36) associated with each transistor. The gate insulator (400,420) comprises a first inorganic layer (400) and a second, polymer or spin-on glass layer (420), of which layers only the polymer or spin-on glass layer (420) extends to the capacitor (36) to define the capacitor dielectric.

13 Claims, 3 Drawing Sheets

LIQUID CRYSTAL DISPLAY HAVING A POLYMER OR SPIN-ON GLASS AS A CAPACITOR DIELECTRIC AND A METHOD OF MANUFACTURE

BACKGROUND OF THE INVENTION

This invention relates to active matrix liquid crystal displays, and particularly to a transistor substrate suitable for use in the manufacture of such a display. The invention particularly concerns transistor substrates for liquid crystal displays which provide a transistor and an associated charge storage capacitor for each pixel of the display. Thin film transistors (TFTs) are commonly employed in active matrix liquid crystal displays.

SUMMARY OF THE INVENTION

There is much interest in improving arrays of TFTs which are used to form the switching elements for flat panel liquid crystal displays. These TFT devices may be fabricated with portions of an amorphous or polycrystalline semiconductor film to form the body of the transistor devices. The thin film transistors define insulated gate structures, and it is known for the gate insulator to extend to the storage capacitor to form the dielectric of that capacitor.

It is also known to provide a two-layer gate insulating structure. This enables the insulating layer adjacent the semiconductor body of the transistor to be patterned together with the patterning of the semiconductor body of the transistor. The electrical properties of the interface between the semiconductor layer and the adjacent gate insulator layer are improved. For example, in the case of a top-gate TFT, the lower gate insulator layer is deposited over the silicon layer which is to define the transistor body, before the silicon layer is patterned to form the silicon regions of the individual TFTs.

It is also known for only one of the gate insulator layers to extend to the charge storage capacitor of the pixel to define the dielectric layer, and this enables the thickness of the gate insulator and the thickness of the capacitor dielectric layer to be set independently. JP-A-4-219736 discloses a transistor-capacitor arrangement of this type.

One problem with the use of a two-layer gate insulating structure, with the two layers patterned differently, is that separate vacuum deposition processes are required, giving rise to additional processing steps in the manufacture of the transistor substrate.

According to a first aspect of the present invention, there is provided a transistor substrate for a liquid crystal display comprising: a transistor over a substrate, the transistor comprising an insulated-gate staggered structure having substantially coplanar source and drain regions and a gate region, a gate insulator lying between the gate region and the source and drain regions; and a capacitor associated with the transistor and lying adjacent the transistor, the capacitor comprising a stacked structure of two electrodes separated by a capacitor dielectric, wherein the gate insulator comprises a first inorganic layer and a second, polymer or spin-on glass layer, of which layers only the polymer or spin-on glass layer extends to the capacitor to define the capacitor dielectric.

The use of a polymer or spin-on glass layer as the second gate insulator layer avoids the need for two vacuum deposition steps in the production of the gate insulator structure.

One possible problem with the use of a polymer or spin-on glass layer is that the uniformity of the film is less accurately controllable than for inorganic layers deposited using vacuum processes. Preferably, therefore, the thickness of the first and second layers are selected such that the charging time constant of each pixel of a liquid crystal display, which includes a transistor and capacitor of the transistor substrate, is invariable to first order changes in the thickness of the second polymer or spin-on glass layer defining the capacitor dielectric. This ensures that the pixel characteristics are substantially independent of thickness variations in the polymer or spin-on glass layer.

In particular, each pixel preferably comprises a capacitor of capacitance $C_{store}$ and is associated with liquid crystal material having a capacitance $C_{LC}$, wherein the thickness of the inorganic layer $d_{inorg}$ and the thickness of the polymer or spin-on glass layer $d_{poly}$ are selected approximately to satisfy the relation:

$$d_{poly} = (C_{store}/C_{LC}) \cdot (\epsilon_{poly}/\epsilon_{inorg}) \cdot d_{inorg}$$

in which $\epsilon_{poly}$ and $\epsilon_{inorg}$ are the permittivity constants of the polymer or spin-on glass layer and the inorganic layer, respectively.

The use of a polymer gate insulating layer has been described in GB 2311653, the contents of which are incorporated herein as reference material.

According to a second aspect of the present invention, there is provided a liquid crystal display comprising a plurality of pixels each comprising a switching transistor, a storage capacitor of capacitance $C_{store}$, and liquid crystal material of capacitance $C_{LC}$, the transistors comprising insulated-gate staggered structures having substantially coplanar source and drain regions and a gate region, a gate insulator lying between the gate region and the source and drain regions, the capacitor comprising a stacked structure of two electrodes separated by a capacitor dielectric, wherein the gate insulator comprises first and second layers, of which layers only the second extends to the capacitor to define the capacitor dielectric, and wherein the thicknesses of the first and second layers are selected such that the charging time constant of each pixel is invariable to first order changes in the thickness of second layer defining the capacitor dielectric.

Irrespective of the nature of the two films defining the gate insulator, a liquid crystal display according to this aspect of the invention enables the pixel response to be invariable to first order changes in the thickness of the capacitor dielectric.

Preferably, for this purpose, the thickness of the first layer $d_1$ and the thickness of the second layer $d_2$ are selected approximately to satisfy the relation:

$$d_2 = (C_{store}/C_{LC}) \cdot (\epsilon_2/\epsilon_1) \cdot d_1$$

in which $\epsilon_1$ and $\epsilon_2$ are the permittivity constants of the first and second layers, respectively.

According to a third aspect of the present invention, there is provided a method of manufacturing a transistor substrate for a liquid crystal display, comprising: providing an array of transistors and capacitors over the substrate, the transistors comprising insulated-gate staggered structures having substantially coplanar source and drain regions and a gate region, a gate insulator lying between the gate region and the source and drain regions; and the capacitors comprising a stacked structure of two electrodes separated by a capacitor dielectric, wherein the gate insulator is deposited as first and second layers, a first layer being deposited by vacuum deposition process, and a second layer being deposited by a non-vacuum process, the first layer being patterned to remove it from areas corresponding to the capacitors, and the second layer extending to the areas corresponding to the capacitors to define the capacitor dielectric.

The use of a non-vacuum process for one of the gate insulator layers simplifies the manufacturing process.

The invention also provides a method of manufacturing a liquid crystal display, comprising manufacturing a transistor substrate using the method above, and providing liquid crystal material over the transistor substrate, wherein the first insulator is deposited to a thickness $d_1$, and the second layer is deposited to a thickness $d_2$, the thicknesses being selected such that the charging time constant of each pixel is invariable to first order changes in the thickness of second layer defining the capacitor dielectric.

Preferably, for this purpose, the capacitors have capacitance $C_{store}$ and each pixel is associated with liquid crystal material of capacitance $C_{LC}$, and wherein the thickness of the first layer $d_1$ and the thickness of the second layer $d_2$ are deposited to depths selected approximately to satisfy the relation:

$$d_2 = (C_{store}/C_{LC}) \cdot (\epsilon_2/\epsilon_1) \cdot d_1$$

in which $\epsilon_1$ and $\epsilon_3$ are the permittivity constants of the first and second layers, respectively.

BRIEF DESCRIPTION OF THE DRAWINGS

A liquid crystal display device and embodiments of the invention will now be described by way of example with reference to the accompanying drawings, in which.

Figure 1:
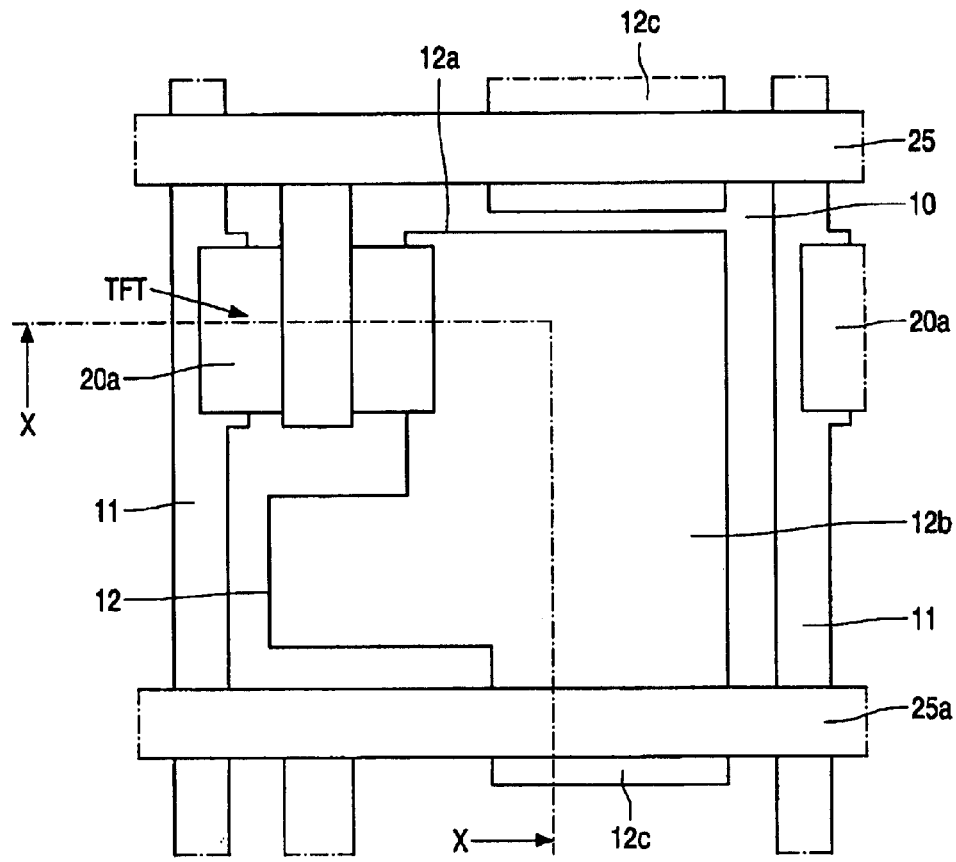
FIG. 1 shows in plan view a pixel of a liquid crystal display device incorporating a transistor-capacitor arrangement using a top gate transistor.

It should be noted that these figures are diagrammatic and not drawn to scale. Relative dimensions and proportions of parts of these figures have been shown exaggerated or reduced in size, for the sake of clarity and convenience in the drawings.

DESCRIPTION OF THE PREFERRED EMBODIMENTS

Transistor substrates according to the invention, and manufactured in accordance with the invention, may form the switching elements of a liquid crystal display device. By way of example, FIG. 1 shows the whole area of one pixel of an active matrix display device, to which the invention may be applied. A pixel comprises an electrode pattern 11 and 12 of, for example, ITO formed on an insulating substrate 10. The substrate 10 may comprise a back plate of the display, for example a glass plate or polymer film. Column conductors 11 of the pattern 11, 12 form common source lines of the switching TFTs in the matrix columns. Another part 12a of the pattern 11, 12 forms a drain electrode of the TFT. In this particular example, the bulk of part 12 of the pattern 11, 12 forms a pixel electrode 12b. This pixel electrode 12b is integral with the drain electrode part 12a and also, in this example, with a part 12c which forms the bottom electrode of a pixel storage-capacitor, the top electrode being defined by a row conductor 25 of a neighbouring pixel.

The row conductors 25 form common gate lines of the TFTs in the rows. The switching TFT of each cell comprises a silicon transistor body 20a. In the example of FIG. 1, these bodies 20a are in the form of separate islands of a silicon film pattern. Typically, the silicon film 20 is of, for example, amorphous silicon. However, rather than amorphous silicon, polycrystalline silicon may be preferred for some displays.

Liquid crystal material is provided over the transistor substrate, the components of which are shown in FIG. 1. Above the liquid crystal material, an additional substrate is provided defining a ground plane. This will be illustrated in further detail below.

Figure 2:
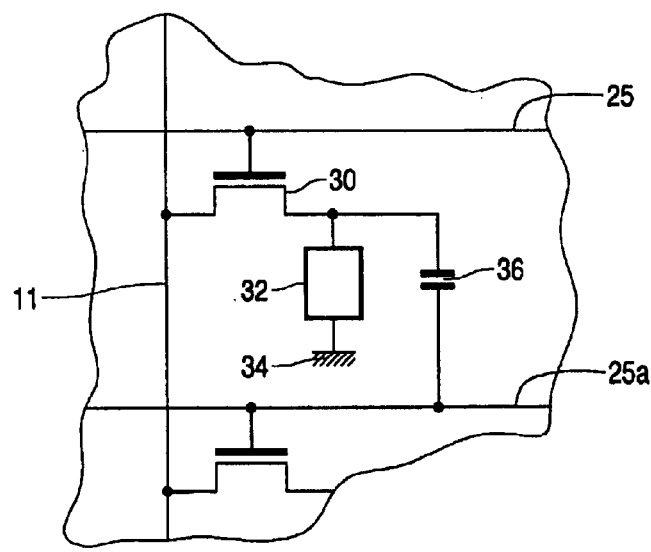
FIG. 2 illustrates the components of a liquid crystal display pixel, for explaining the operation of the display device.

FIG. 2 shows the electrical components which make up the pixels shown in FIG. 1. The row conductor 25 is connected to the gate of the TFT 30, and the column electrode 11 is coupled to the source electrode, as explained with reference to FIG. 1. The liquid crystal material provided over the pixel effectively defines a liquid crystal cell 32 which extends between the drain of the transistor 30 and a common ground plane 34. The pixel storage capacitor 36 is connected between the drain of the transistor 30 and the row conductor 25a associated with the next row of pixels.

During operation of the display device, signals are applied to rows of pixels in turn. In order to address a row of pixels, an appropriate signal is applied to the associated row conductor 25 to turn on the transistors 30 of the row of pixels. This enables a display signal applied to the column conductor 11 to be fed to the liquid crystal cell 32, which results in charging of the liquid crystal cell to the desired voltage. The storage capacitor 36 is also charged and is provided to ensure that the signal on the liquid crystal cell 32 remains constant even after the addressing of that particular row has been completed, and the transistors 30 have been turned off. During addressing of the row of pixels, the row conductor 25a of the subsequent row of pixels is held at ground potential so that the storage capacitor 36 is charged to a voltage corresponding to that which is to be applied across the liquid crystal cell 32.

When the next row of pixels is addressed, there will be an increase in the voltage of the row conductor 25a, which will feed through the capacitor 36 by capacitive coupling to the liquid crystal cell 32. However, this increased voltage on the next row conductor 25a only lasts for one row address period, after which that row conductor 25a returns to ground. The liquid crystal material has slower response time and does not respond to these instantaneous voltage changes.

Figure 3:
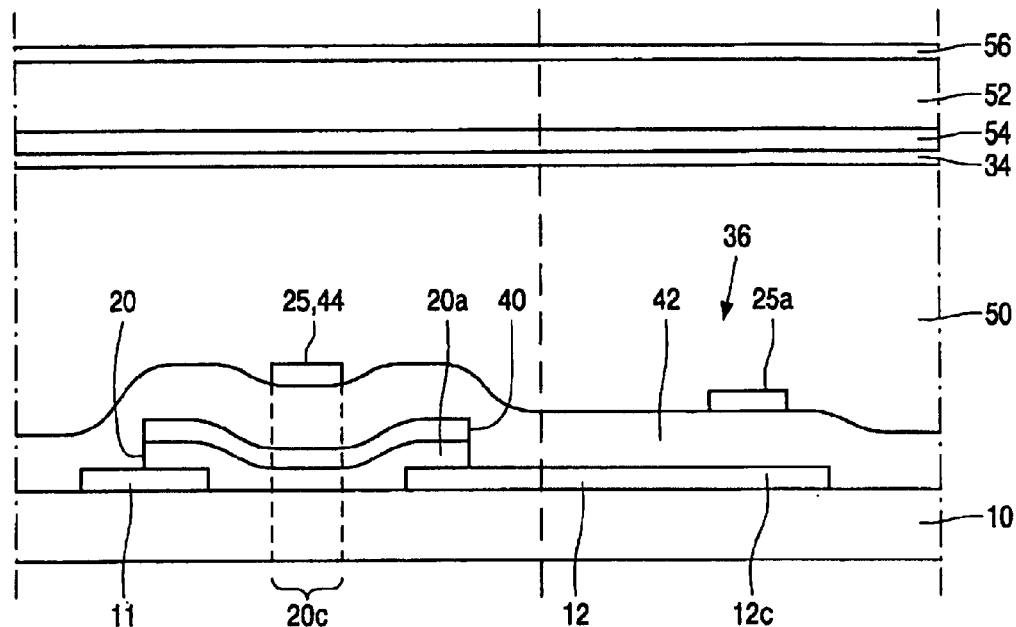
FIG. 3 shows a cross-section through a liquid crystal display taken along the line X—X in FIG. 1, and showing a known arrangement.

FIG. 3 shows a known structure for a liquid crystal display, shown in cross section through the line X—X in FIG. 1, which uses top gate TFTs. The manufacture of the known liquid crystal display shown in FIG. 3 will now be described. A source and drain electrode pattern 11, 12 is provided on the substrate 10. For example, an ITO conductor layer may be deposited on a glass substrate 10, and wet etching may be performed in order to define the source and drain electrode pattern. A silicon film 20 is deposited on the source and drain electrode pattern 11, 12 to provide the transistor body 20a comprising the channel area 20c of the TFT. A first gate insulator layer 40 is provided over the semiconductor layer 20, and the first gate insulator layer 40 and the semiconductor layer 20 are patterned using the same mask to define the semiconductor island forming the transistor body 20a. The deposition of the first gate insulator layer 40 over the semiconductor layer 20 before patterning of the semiconductor 20 improves the electrical characteristics of the interface between the insulator layer 40 and the semiconductor layer 20.

A second, upper gate insulating layer 42 is then deposited over the array and a gate conductor 44 is provided over the upper gate insulator 42. The upper gate insulator layer 42 extends beyond the body of the transistor and defines the dielectric layer for the storage capacitor 36. This storage capacitor 36 is defined by the next row conductor 25a and a portion 12c of the drain electrode 12.

These layers complete the transistor substrate for the liquid crystal display. A layer of liquid crystal material 50 is provided over the transistor substrate, and a further substrate 52 overlies the layer of liquid crystal material. This further substrate 52 may be provided on one face with an arrangement of colour filters 54 and a plate defining the common electrode 34. A polarising plate 56 is provided on the opposite side of the substrate 52.

This invention is concerned specifically with the transistor substrate, and therefore the operation and construction of the liquid crystal display will not be described in any further detail as this will be apparent to those skilled in the art.

A top gate thin film transistor is represented in FIG. 3, but it is equally possible to utilise bottom gate thin film transistors. The application of the invention to transistor substrates using top gate TFTs will first be described, and then the application of the invention to transistor substrates using bottom gate TFTs will also be described. The gate 44 is shown in FIG. 3 as having a width less than the spacing between the source and drain electrodes 11, 12. Some processing of the semiconductor layer 20 between the channel area 20c and the source and drain electrodes 11, 12 respectively is preferred to reduce the resistance of that part of the semiconductor layer. For example, the source and drain regions of the semiconductor layer may be doped, for example using plasma doping with the gate conductor 44 masking the underlying intrinsic semiconductor channel area 20c. Alternatively, the source and drain regions of the semiconductor layer 20 may be subjected to ion implantation using the top gate structure as an implantation mask. As a further alternative, the source and drain regions of the semiconductor layer may be treated to form silicide material, again to reduce the resistance to the source and drain electrodes.

Additional layers to those described may be provided. For example, a planarising film may be provided over the entire structure. Additionally, a further electrode pattern may be defined over this planarising layer which contacts the drain 12 through a well provided in the second insulator 42. All of these possibilities, and others, will be apparent to those skilled in the art.

Conventionally, the first gate insulator layer 40 comprises a first silicon nitride layer of thickness approximately 80 nm, and the second gate insulator layer 42 comprises a second silicon nitride layer of much greater thickness, for example 250 nm. Since these two layers are patterned differently, separate vacuum deposition processes, for example plasma chemical vapour deposition, are required to define the two layers.

Figure 4:
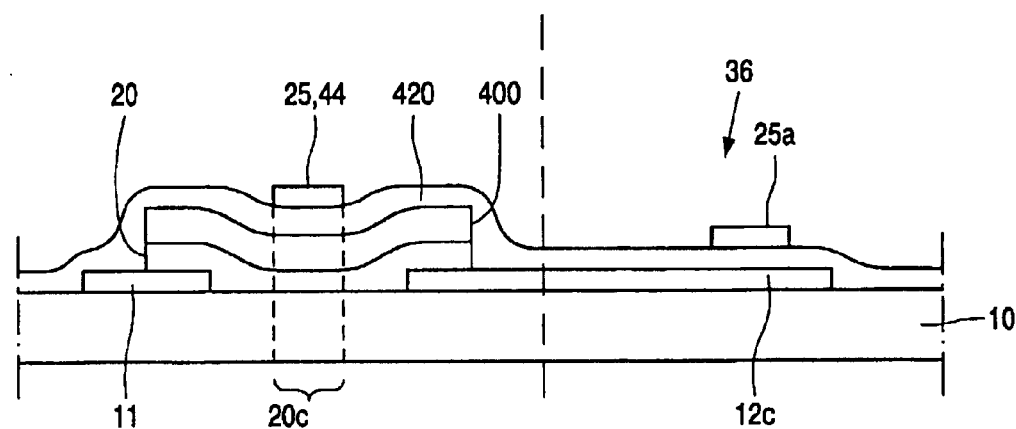
FIG. 4 shows a first transistor substrate according to the invention using top gate transistors, for use in the liquid crystal display of FIG. 1.

FIG. 4 shows a transistor substrate for use with the liquid crystal display according to the invention, and using top gate TFTs. The comments made in connection with FIG. 3 concerning the possible alternatives to the transistor design apply equally to the transistor substrate of the invention. The same reference numerals have been used in FIG. 4 to denote the same components as those shown in FIG. 3.

In the structure shown in FIG. 4, the first gate insulator layer 400 comprises an inorganic layer, deposited by a vacuum deposition process. For example, this layer may comprise silicon nitride deposited by plasma enhanced chemical vapour deposition (PECVD). The second gate insulator layer 420, however, comprises a polymer or spin-on glass layer which is deposited by a non-vacuum process. This non-vacuum process may comprise spinning, rolling or spraying, and this reduces the cost of that processing step. One potential problem with the use of a polymer or spin-on glass insulator layer is that the thickness control and uniformity is likely to be worse than that of a PECVD layer.

For given geometry and bias conditions of the thin film transistor, the current output of the transistor is proportional to the gate dielectric capacitance, and hence the current output falls if the polymer or glass layer is made thicker. However, the total load capacitance (the storage capacitance 36 and the capacitance of the liquid crystal material 50 associated with the pixel) is also reduced as the polymer layer thickens. The overall charging time of the pixel is therefore fairly insensitive to thickness variations.

Figure 5:
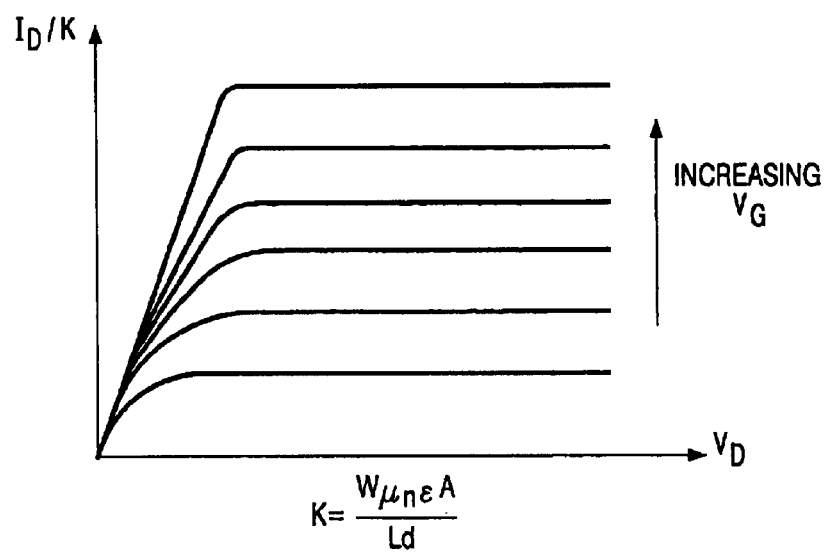
FIG. 5 illustrates the operating characteristics of a thin film transistor.

It is this property which is exploited in accordance with the invention. FIG. 5 shows the voltage-current characteristics of a MOSFET. As shown, the current axis is normalised with respect to a constant K which is derived from the channel width W, the channel length L, the gate insulator permittivity $\epsilon$, the gate insulator thickness d and the electron mobility $\mu_n$ (for an n-type MOSFET). For given transistor dimensions (i.e. W and L), this constant is proportional to the gate dielectric capacitance:

$$C = \frac{A\varepsilon}{d}$$

Consequently, the effective transistor resistance for any given set of bias conditions and dimensions may be considered to vary inversely proportionally with respect to the gate capacitance C. For the double layer gate insulator the gate capacitance is given by:

$$\frac{1}{C_{gate}} = \frac{1}{C_1} + \frac{1}{C_2}$$
$$= \frac{d_1}{A\varepsilon_1} + \frac{d_2}{A\varepsilon_2}$$
$$C_{gate} = \frac{A\varepsilon_1\varepsilon_2}{d_1\varepsilon_2 + d_2\varepsilon_1}$$

in which $d_1$ and $d_2$ are the thicknesses of the first and second insulating layers, and $\epsilon_1$ and $\epsilon_2$ are their permittivity constants.

The transistor resistance is inversely proportional to the gate capacitance, and is thereby given by:

$$R_{TFT} \propto \frac{d_1\varepsilon_2 + d_2\varepsilon_1}{A\varepsilon_1\varepsilon_2}$$

For given insulator layers (i.e. $\epsilon_1$ and $\epsilon_2$ are constants) but with selectable thickness, the transistor resistance varies in proportion with:

$$R_{TFT} \propto d_1\varepsilon_2 + d_2\varepsilon_1$$

To evaluate the time constant for the TFT-capacitor pixel, the combined capacitance of the LC cell 32 and the storage capacitor 36 needs to be considered. The total pixel capacitance is:

$$C_{LC} + C_s = C_{LC} + \frac{A_s \varepsilon_2}{d_2}$$

where $C_{LC}$ is the capacitance of the liquid crystal material associated with the pixel, $C_s$ is the storage capacitance, and $A_s$ is the area of the storage capacitor. Consequently, the charging time constant of the pixel is proportional to:

$$\tau_{RC} \propto C_{LC} d_1 \varepsilon_2 + A_s \varepsilon_1 \varepsilon_2 + C_{LC} d_2 \varepsilon_1 + \frac{\varepsilon_2^2 A_s d_1}{d_2}$$

This charging time constant is invariable to the capacitor dielectric thickness $d_2$ when the following equation is satisfied:

$$\frac{\partial}{\partial d_2} \tau_{RC} = 0$$

This yields:

$$d_2 = \frac{A_s \varepsilon_2}{d_2 C_{LC}} \cdot \frac{\varepsilon_2}{\varepsilon_1} \cdot d_1$$

$$d_2 = \frac{C_S}{C_{LC}} \cdot \frac{\varepsilon_2}{\varepsilon_1} \cdot d_1$$

This analysis enables the thickness of the two insulator layers to be selected such that variations in the thickness of the capacitor dielectric do not alter the charge timing constant of the pixel and thereby do not change the display operating characteristics. The kickback behaviour is also invariant to small changes in thickness of the spin on or glass layer.

Figure 6:
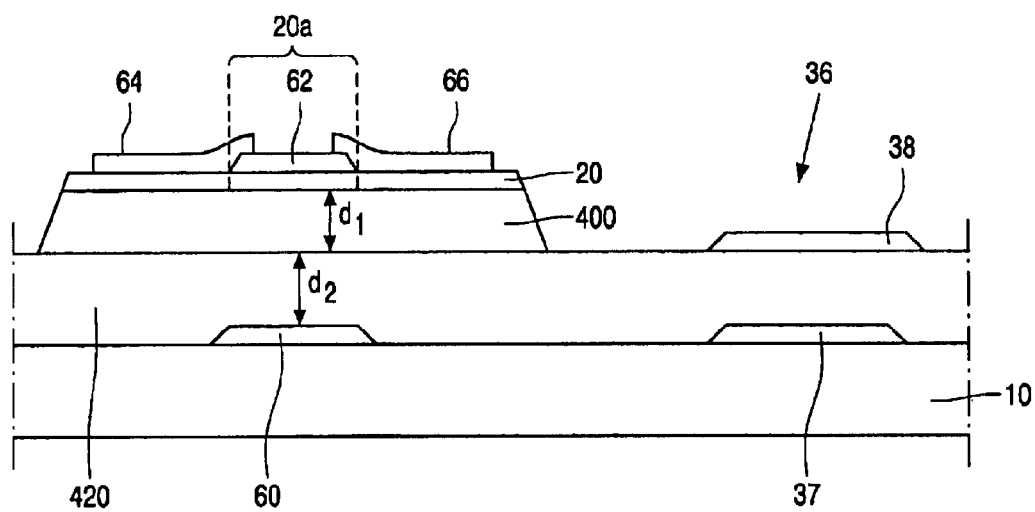
FIG. 6 shows a second transistor substrate according to the invention using bottom gate transistors, for use in a liquid crystal display.

FIG. 6 shows a transistor substrate for use with the liquid crystal display according to the invention, and using bottom gate TFTs. A gate electrode pattern 60 is provided on the substrate 10, and which also defines the lower terminal 37 of the storage capacitor 36. The gate of the transistor again forms part of the respective row conductor, and the lower terminal 37 of the storage capacitor may form part of the row conductor for the next adjacent row of pixels. For example, a conductor layer may be deposited on a glass substrate 10, and wet etching may be performed in order to define the conducting pattern.

The polymer or spin-on gate dielectric layer 420 is then deposited. For the sake of clarity, and consistency with the equations given above, this dielectric layer shall be referred to again as the "second" gate dielectric layer, and has thickness $d_2$. This second gate insulator layer 420 again extends beyond the body of the transistor, and defines the dielectric layer for the storage capacitor 36.

The first gate insulator layer 400 is then deposited comprising an inorganic material such as silicon nitride. The amorphous silicon layer 20 forming the body of the transistor is deposited before patterning of the first insulator layer 400, so that these two layers 20, 400 are patterned together using the same mask to define the semiconductor island forming the transistor body 20a. Again, this improves the electrical characteristics of the interface between the insulator layer 400 and the semiconductor layer 20.

It is preferred to have the semiconductor body of the transistor adjacent the inorganic gate dielectric layer, to enable a good quality interface. However, it may also be possible to implement the invention with the spin-on or polymer layer of the gate dielectric structure adjacent the semiconductor layer of the transistor.

An etch stop plug 62 is patterned overlying and aligned with the gate 60, and the source and drain electrodes 64, 66 are then deposited. The layer defining the source and drain electrodes also defines the top contact 38 of the storage capacitor 36. In order for the display pixels to function in the same way as the pixel configuration described with reference to FIGS. 1 to 3, one of the source and drain needs to make contact with a respective column conductor, and the other needs to make contact with a liquid crystal contact pad and with the top contact of the storage capacitor 36. The possible ways of achieving this will be apparent to those skilled in the art. Of course, additional layers to those described may be required for this purpose.

Examples will now be given of the dimensions dictated by this approach for examples of gate insulator layers.

The relationship between the storage capacitor value and the capacitance of the liquid crystal cell is determined by the display design and type. For a transmissive display, the storage capacitor should be as small as possible, as it occupies aperture space of the display. For example, for an amorphous silicon transmissive display, $C_{store}/C_{LC}$ may be as low as 1, whereas the ratio is likely to be nearer 3 for poly-silicon displays. For reflective displays, the storage capacitor can lie under the pixel without causing aperture loss, and ratios as high as 4 may be used.

The ratio of $\epsilon_{poly}/\epsilon_{inorg}$ depends on the dielectric layers chosen. Taking the first dielectric layer to be SiN, $\epsilon_{inorg}$ is about 6.4. $\epsilon_{poly}$ can take on a wide range of values. For example, Kapton is a commercially available form of polyimide which has a value of $\epsilon$ of about 3.4. A suitable spin-on polymer is Accuspin T-18, formulated by Allied Signal Advanced Microelectronic Materials (AMM), which has a dielectric constant of around 2.7. A range of values may be obtained using spin-on glass compositions. An example is the Accuglass P-TTY A Series family of phosphosilicate spin-on glasses from AMM. They exhibit dielectric constants of around 4.2.

As a result of these different possibilities, the required ratio of the thickness of the spin-on or glass layer to the inorganic layer will vary significantly as a function of the display and the materials selected. If polyimide and silicon nitride are selected the ratio will vary between approximately 0.5 and 2 depending on the type of display.

For example, if the liquid crystal capacitance and the charge storage capacitance have approximately equal values, which is approximately correct for a transmissive amorphous silicon display, the ratio of the insulator layer thicknesses must be inversely proportional to the ratio of their permittivity constants. Silicon nitride with permittivity of 6.4, and polyimide, of permittivity of 3.4, requires the polyimide insulator layer to have a thickness of approximately half of the thickness of the silicon nitride layer.

In this example, the thickness of the polymer layer may be impracticably thin, so a second insulator layer of higher permittivity constant is preferred, which may be achieved using glass insulators.

The combined thickness of the two dielectric layers (rather than the ratio of their individual thicknesses) may be selected to obtain desired transistor operating characteristics. For example, for a TFT with a single gate insulator layer of SiN, a typical thickness of 300 to 400 nm is used. The double layer gate insulator dielectric may be designed to produce similar gate capacitance.

For given transistor dimensions, the gate capacitance of a silicon nitride gate insulator of 350 nm thickness is:

$$C = \frac{A\varepsilon_1}{350 \times 10^{-9}}$$

The gate capacitance of the double layer gate insulator is:

$$C = \frac{A\varepsilon_1\varepsilon_2}{d_1\varepsilon_2 + \frac{C_S}{C_{LC}}\varepsilon_2 d_2}$$

Equating these gives:

$$d_1 = \frac{350}{1+\frac{C_S}{C_{LC}}} \text{ nm}$$

For the values above for polyimide and silicon nitride, and assuming equal storage and LC capacitance, $d_1$ is 175 nm and $d_2$ is 93 nm. Assuming the storage capacitance is 4 times the and LC capacitance, $d_1$ is 70 nm and $d_2$ is 147 nm. Of course, the thicknesses relate to the layer thicknesses in the gate region of the transistor, not elsewhere.

Various modifications to the specific layers used in the manufacture of the TFT substrate will be apparent to those skilled in the art, which do not prohibit the use of the invention in those transistor substrates.

From reading the present disclosure, other variations and modifications will be apparent to persons skilled in the art. Such variations and modifications may involve equivalent and other features which are already known in the design, manufacture and use of electronic devices comprising thin-film circuits, semiconductor devices, and component parts thereof and which may be used instead of or in addition to features already described herein.

Although claims have been formulated in this Application to particular combinations of features, it should be understood that the scope of the disclosure of the present application also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention. The Applicants hereby give notice that new claims may be formulated to such features and/or combinations of such features during the prosecution of the present Application or of any further Application derived therefrom.

What is claimed is:

1. A transistor substrate for a liquid crystal display comprising:
    a substrate;
    a transistor over said substrate, said transistor having an insulated-gate staggered structure with substantially coplanar source and drain regions on said substrate, a gate region, and a gate insulator lying between said gate region and said source and drain regions; and
    a capacitor associated with said transistor and lying adjacent thereto, said capacitor having a stacked structure of two electrodes separated by a capacitor dielectric,
    wherein said gate region has a first inorganic layer and a second, polymer or spin-on glass layer, of which layers only the polymer or spin-on glass layer extends to said capacitor to define said capacitor dielectric.

2. A transistor substrate as claimed in claim 1, wherein the polymer or spin-on glass layer comprises polyimide.

3. A transistor substrate as claimed in claim 1, wherein the transistor comprises a top gate transistor.

4. A liquid crystal display comprising a plurality of pixels provided over a transistor substrate as claimed in claim 1, each pixel comprising a respective transistor and capacitor, and wherein the thicknesses of the first and second layers are selected such that the charging time constant of each pixel is invariable to first order changes in the thickness of second polymer or spin-on glass layer defining the capacitor dielectric.

5. A liquid crystal display as claimed in claim 4, wherein, each pixel comprises a capacitor of capacitance $C_{store}$ and is associated with liquid crystal material having a capacitance $C_{LC}$, wherein the thickness of the inorganic layer $d_{inorg}$ and the thickness of the polymer or spin-on glass layer $d_{poly}$ are selected approximately to satisfy the relation:

$$d_{poly} = (C_{store}/C_{LC}) \cdot (\epsilon_{poly}/\epsilon_{inorg}) \cdot d_{inorg}$$

in which $\epsilon_{poly}$ and $\epsilon_{inorg}$ are the permittivity constants of the polymer or spin-on glass layer and the inorganic layer, respectively.

6. A liquid crystal display comprising:
    a plurality of pixels each having a switching transistor, a storage capacitor of capacitance $C_{store}$, and liquid crystal material of capacitance $C_{LC}$, said transistors having insulated-gate staggered structures with substantially coplanar source and drain regions on said substrate, a gate region, and a gate insulator lying between said gate region and said source and drain regions, said capacitor having a stacked structure of two electrodes separated by a capacitor dielectric,
    wherein said gate region has first and second layers, of which layers only the second extends to said capacitor to define said capacitor dielectric, and wherein the thicknesses of said first and second layers are selected such that the charging time constant of each pixel is invariable to first order changes in the thickness of second layer defining the capacitor dielectric.

7. A display as claimed in claim 6, wherein the thickness of the first layer $d_1$ and the thickness of the second layer $d_2$ are selected approximately to satisfy the relation:

$$d_2 = (C_{store}/C_{LC}) \cdot (\epsilon_2/\epsilon_1) \cdot d_1$$

in which and are the permittivity constants of the first and second layers, respectively.

8. A display as claimed in claim 6, wherein the first layer comprises an inorganic layer, and the second layer comprises a polymer or spin-on glass layer.

9. A display as claimed in claim 8, wherein the second layer comprises polyimide.

10. A method of manufacturing a transistor substrate for a liquid crystal display, comprising providing an array of transistors and capacitors over the substrate, said transistors having insulated-gate staggered structures with substantially coplanar source and drain regions, a gate region, and a gate insulator lying between said gate region and said source and drain regions on said substrate; and said capacitors having a stacked structure of two electrodes separated by a capacitor dielectric,
    wherein said gate region is deposited as first and second layers, a first layer being deposited by vacuum deposition process, and a second layer being deposited by a non-vacuum process, said first layer being patterned to remove it from areas corresponding to said capacitors, and said second layer extending to the areas corresponding to said capacitors to define said capacitor dielectric.

11. A method of manufacturing a liquid crystal display, comprising manufacturing a transistor substrate using the method of claim 10, and providing liquid crystal material over said transistor substrate, wherein said first layer is deposited to a thickness $d_1$, and said second layer is deposited to a thickness $d_2$, the thicknesses being selected such that the charging time constant of each pixel is invariable to first order changes in the thickness of second layer defining the capacitor dielectric.

12. A method as claimed in claim 11, wherein the capacitors have capacitance $C_{store}$ and each pixel is associated with liquid crystal material of capacitance $C_{LC}$, and wherein the thickness of the first layer $d_1$ and the thickness of the second layer $d_2$ are deposited to depths selected approximately to satisfy the relation:

$$d_2 = (C_{store}/C_{LC}) \cdot (\epsilon_2/\epsilon_1) \cdot d_1$$

in which $\epsilon_1$ and $\epsilon_2$ are the permittivity constants of the first and second layers, respectively.

13. A transistor substrate as claimed in claim 1, wherein said gate insulator and said first inorganic layer are patterned using the same mask to define a semiconductor island forming a transistor body.

* * * * *